US012234566B2

(12) United States Patent
Gubler et al.

(10) Patent No.: US 12,234,566 B2
(45) Date of Patent: Feb. 25, 2025

(54) METHOD FOR PREPARING A POLYMER MEMBRANE FOR A POLYMER ELECTROLYTE WATER ELECTROLYSER

(71) Applicant: Paul Scherrer Institut, Villigen PSI (CH)

(72) Inventors: Lorenz Gubler, Untersiggenthal (CH); Ugljesa Babic, Baden (CH); Thomas Justus Schmidt, Kleindoettingen (CH); Steffen Garbe, Dietikon (CH)

(73) Assignee: Paul Scherrer Institut, Villigen PSI (CH)

( * ) Notice: Subject to any disclaimer, the term of this patent is extended or adjusted under 35 U.S.C. 154(b) by 379 days.

(21) Appl. No.: 17/612,018

(22) PCT Filed: May 13, 2020

(86) PCT No.: PCT/EP2020/063331
§ 371 (c)(1),
(2) Date: Nov. 17, 2021

(87) PCT Pub. No.: WO2020/234085
PCT Pub. Date: Nov. 26, 2020

(65) Prior Publication Data
US 2022/0251721 A1    Aug. 11, 2022

(30) Foreign Application Priority Data
May 17, 2019   (EP) .................................... 19175071

(51) Int. Cl.
*C25B 13/08*        (2006.01)
*C23C 18/16*        (2006.01)
(Continued)

(52) U.S. Cl.
CPC .......... *C25B 13/08* (2013.01); *C23C 18/1641* (2013.01); *C23C 18/1644* (2013.01);
(Continued)

(58) Field of Classification Search
CPC ....... C25B 13/08; C25B 1/04; C23C 18/1641; C23C 18/1644; C23C 18/2053; C23C 18/44
See application file for complete search history.

(56) References Cited

U.S. PATENT DOCUMENTS

| 4,959,132 A | 9/1990 | Fedkiw, Jr. |
| 5,342,494 A * | 8/1994 | Shane ................. C25B 1/04 427/322 |

(Continued)

FOREIGN PATENT DOCUMENTS

FR    2788168 A1 *   7/2000   ........... C25B 11/035

OTHER PUBLICATIONS

Bessarabov "Membranes with Recombination Catalyst for Hydrogen Crossover Reduction: Water Electrolysis" ECS Trans. 85, 17 2018.*

(Continued)

*Primary Examiner* — Robert S Walters, Jr.
(74) *Attorney, Agent, or Firm* — Laurence A. Greenberg; Werner H. Stemer; Ralph E. Locher

(57) ABSTRACT

A method of preparing an ionomer of an ion exchange membrane with a recombination catalyst to prevent gas crossover of species, such as hydrogen and/or oxygen, to anodic and cathodic cell compartments of an electrochemical cell. An ionomer of an ion exchange membrane is prepared with a recombination catalyst. The ionomer is a proton or anion exchange polymer and the recombination catalyst, selected from the precious metals group, is provided in ionic form in a liquid metal salt solution. The ion exchange membrane is immersed into the liquid metal salt solution to exchange ionic ionomer ports with the ionic form of the recombination catalyst. The membrane is then assembled in the electrochemical cell and the ionic form of the recombination catalyst is at least partly reduced to
(Continued)

metallic form by forcing hydrogen to permeate through the ionomer of the ion exchange membrane.

7 Claims, 5 Drawing Sheets

(51) Int. Cl.
    *C23C 18/20*     (2006.01)
    *C23C 18/44*     (2006.01)
    *C25B 1/04*     (2021.01)

(52) U.S. Cl.
    CPC .......... *C23C 18/2053* (2013.01); *C23C 18/44* (2013.01); *C25B 1/04* (2013.01)

(56) References Cited

U.S. PATENT DOCUMENTS

| | | |
|---|---|---|
| 6,485,855 B1 | 11/2002 | Fukuda et al. |
| 2008/0044720 A1 | 2/2008 | Moon et al. |

OTHER PUBLICATIONS

Dmitri Bessarabov, "(Invited) Membranes with Recombination Catalyst for Hydrogen Crossover Reduction: Water Electrolysis", ECS Transactions, vol. 85, No. 11, Apr. 5, 2018 (Apr. 5, 2018), p. 17-25, XP055635449 DOI: 10.1149/08511.0017ecst, ISSN:1938-6737, abstract, figures 8, 9, p. 18, paragraph 4, p. 19, paragraph 1, p. 22, paragraph 2—p. 24, paragraph 1.

\* cited by examiner $$\text{Anodic recation } H_2O \rightarrow H^+ + \frac{1}{2}O_2(g) \quad (1.23\ V\ vs\ RHE)$$

$$\text{Cathodic reaction } 2H^+ \rightarrow H_2(g) \quad (0\ V\ vs\ RHE)$$

$$\text{Overall reaction } H_2O \rightarrow H_2(g) + \frac{1}{2}O_2(g)$$

METHOD FOR PREPARING A POLYMER MEMBRANE FOR A POLYMER ELECTROLYTE WATER ELECTROLYSER

FIELD AND BACKGROUND OF THE INVENTION

The present invention relates to a method for preparing a polymer membrane for a polymer electrolyte water electrolyser.

The polymer electrolyte water electrolyser (PEWE) is an electrochemical device where the electrodes are separated by a solid proton conducting polymer membrane. On the anode side water is split into oxygen and protons. Protons are transported to the cathode under the influence of the electric field, where molecular hydrogen is evolved. A key concern for the safe operation of PEWE cells is the high hydrogen gas crossover, which can lead to explosive hydrogen-oxygen gas mixtures. The safety aspect is especially important with thin membranes and high differential pressures.

Water electrolysis has a potential to be a key technology in the energy transition from the traditional fossil-based to the renewable, carbon-free systems. Power supply based on a significant share of these "new renewables" is associated with large discrepancies between supply and demand, owing to the intermittent nature of these primary energy sources. Water electrolysis is a clean and efficient process which offers strong prospects to store large amounts of excess electricity in form of chemical energy ('power-to-gas'). It is also a key component in coupling different sectors (electricity, mobility, heating) through the power-to-x concept. A state of the art PEWE cell as shown in FIG. 1 comprises a positive electrode for the oxygen evolution reaction (OER), a negative electrode for the hydrogen evolution reaction (HER) and a separator which electronically insulates the electrodes and prevents the cross-mixing of the evolved gases, while allowing proton transport. State-of-the-art membrane water electrolyzers use a proton exchange membrane and, owing to the thin polymer electrolyte (~0.2 mm) with low ohmic resistance, can operate at relatively high current densities (1-3 A/cm$^2$) and differential pressures. The OER is catalysed by precious metals such as Ir and Ru due to their activity and stability in acidic medium. The most common catalyst for the HER in PEWE is Pt.

The production rate of gases in the PEWE cell is directly proportional to the current density applied, according to Faraday's laws. Increasing the current density while maintaining conversion efficiency by using thinner membranes is an approach for increasing the rate of $H_2$ production per unit cell area of the PEWE. Thinner membranes allow for higher current density at a given cell voltage, and thereby effectively decrease the investment costs for the electrolyzer stack. Current densities up to 19 A/cm$^2$ have been reported using a 50 μm thick membrane, with a cell potential of 3 V. The associated power density is on the order of 50 W/cm$^2$.

Pressurized PEWE could make subsequent compression of gases redundant or reduce the effort for drying with mechanical compression. Especially differential pressurized PEWE is attractive for high purity hydrogen generation and higher faradaic efficiency compared to balanced pressure operation. The diffusion rate of hydrogen to the anode side strongly depends on the thickness of the membrane and the partial pressure applied. Since the diffusion coefficient of hydrogen in the membrane is about twice as high as the diffusion coefficient of oxygen, and the majority of oxygen diffusing to the cathode side recombines on the Pt cathode catalyst layer, the hydrogen content in the oxygen content on the anode side is a major safety aspect in PEWE, especially at high partial pressures using thin membranes. The lower explosion limit of hydrogen in oxygen is at 4%.

Gas crossover can be suppressed by impregnating platinum particles into the membrane. Permeated hydrogen and oxygen recombine on the surface of the platinum particles to water. So far, there are two methods to introduce the recombination catalysts in the PEM:

1) In a first step, the membrane is immersed into a platinum ion containing solution. Platinum ions are taken up by the proton exchange membrane through an ion exchange process. In a second step, the platinum ion doped membrane is placed into a solution containing a chemical reduction agent, such as $N_2H_4$ or $NaBH_4$, to reduce the Pt ions to Pt. The Pt particles are preferentially reduced at the membrane-solution interface.

2) A layer of ionomer containing platinum particles is spray-coated onto one membrane. A second membrane is hot-pressed onto the first membrane, facing the platinum-containing layer. A platinum interlayer between the two membranes is thus prepared. The performance is reported to be worse than using a pristine membrane.

Another approach has been disclosed by D. Bessarabov, "Membranes with Recombination Catalyst for Hydrogen Crossover Reduction: Water Electrolysis", ECS Trans 85(11) (2018) 17-25, and the US Patent application US 2008/0044720, "Membrane Electrode Assembly having Porous Electrode Layers, Manufacturing Method thereof, and Electrochemical Cell Comprising the same".

Bessarabov discloses the introduction of a recombination catalyst in the proton exchange membrane thereby using platinum salt as a precursor. Here, the chemical reduction step to produce metallic Pt particles uses hydrazine (N2H4), i.e. in its form of sodium borohydride (NaBH4). Unfortunately, this leads to the formation of a very inhomogeneous distribution of Pt recombination catalyst across the thickness of the proton exchange membrane (cf. FIG. 3 in Bessarabov, also FIG. 6 bottom). These results has been also confirmed during measurements executed in the laboratories of the applicant.

Further, the US patent application mentioned above discloses a method to produce a porous catalyst layer for electrochemical cells (fuel cell, electrolyzer) from a precursor consisting of a two types of metal salt which cannot be compared to the generation of a homogenous distribution of metallic catalyst particles across the thickness of the ion exchange membrane. One type of metal cation is reduced by the reducing agent BH4- to the metal, forming the electrocatalyst. The other type is not reduced but is easily dissolved and washed out to leave behind porosity, which improves cell performance.

However, none of the prior art documents disclose a way to achieve a homogenous distribution of metallic particles of a recombination catalyst from the precious metals group across the thickness of the ion exchange membrane.

SUMMARY OF THE INVENTION

It is therefore the objective of the present invention to provide a method for preparing a polymer membrane for a polymer electrolyte water electrolyser in order to achieve thin membranes with high crossover suppression and without showing a negative impact on the cell performance.

This objective is achieved according to the present invention by a method to prepare an ionomer of an ion exchange membrane with a recombination catalyst to prevent gas crossover of species, such as hydrogen and/or oxygen, to anodic and cathodic cell compartments of an electrochemical cell; said method comprising the steps of:

a) providing the ionomer as a proton or an anion exchange polymer;

b) selecting the recombination catalyst from the precious metals group;

c) providing the selected recombination catalyst in an ionic form being comprised in a liquid metal salt solution;

d) immersing the ion exchange membrane into the liquid metal salt solution thereby exchanging at least a part of the ion exchange sites of the ion exchange membrane with the ionic form of the recombination catalyst;

e) assembling the immersed ion exchange membrane in the electrochemical cell; and f) at least partially reducing the ionic form of the recombination catalyst into the metallic form by forcing hydrogen to permeate through the ionomer of the ion exchange membrane.

Therefore, the present invention presents a new reduction method for Pt-Ions by diffusing hydrogen through the PEM in a PEWE cell. The presented solution provides a way to achieve thin membranes with high crossover suppression, without a negative impact on the cell performance and a reduction in-situ on the flight by the homogenous distribution.

In order to achieve the high crossover suppression, the ionic form of the recombination catalyst is distributed homogenously over the whole cross section of the ionomer of the ion exchange membrane. Preferably, the electrochemical cell is a polymer electrolyte water electrolyzer.

Depending on the ionic characteristic of the ion exchange membrane, it is reasonable when the ionic form of the recombination catalyst is either a cationic form or an anionic form.

Preferably, the selected metal is platinum. Alternatively, palladium or silver can be used.

Preferred embodiments of the present invention are hereinafter described in more detail with reference to the attached drawings which depict in:

DETAILED DESCRIPTION OF THE INVENTION

The present invention presents a viable and efficient way of introducing recombination catalyst particles homogenously over the whole cross-section of a polymer electrolyte membrane (PEM) without a second external reduction step. PEMs are immersed into a recombination catalyst precursor ion containing solution. The recombination catalyst precursor ion-doped PEM is exposed to hydrogen gas from one side. The hydrogen diffusing through the membrane reduces the recombination catalyst precursor ions to metallic particles.

Figure 1:
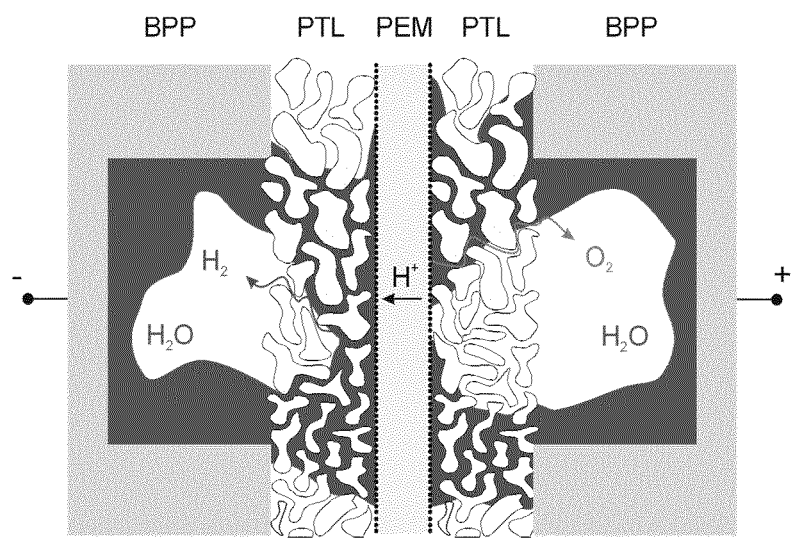
FIG. 1 schematically the known principle of a PEWE cell and the electrochemical reactions taking place therein.

FIG. 1 shows a schematic representation of the cross section of a PEWE cell and the electrochemical reactions taking place at the anode and cathode catalyst, including the overall water splitting reaction (BBP=Bipolar plate, PTL=Porous transport layer, RHE=Reference hydrogen electrode).

Figure 2:
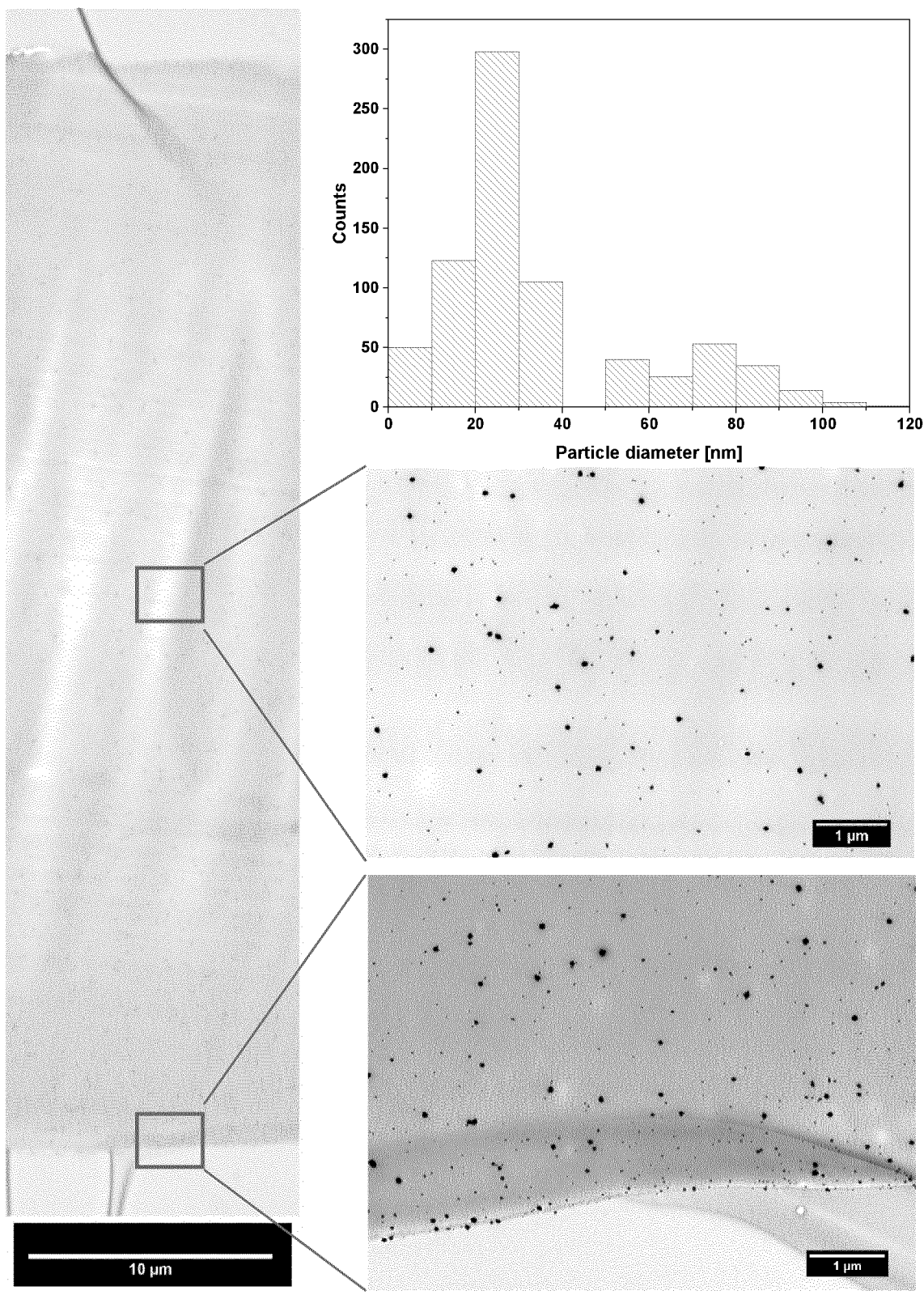
FIG. 2 a transmission electron microscopy (TEM) image of the cross-section of a hydrogen reduced platinum PEM (H2-Pt N212)

FIG. 2 shows a transmission electron microscopy (TEM) image of the cross-section of a hydrogen reduced platinum PEM ($H_2$-Pt N212) introduced in the present study. The Pt particles are homogenously distributed over the whole membrane and the particles diameter ranges between 1 and 120 nm. Pt impregnated PEMs were assembled into an above described electrolyzer system. In detail, the transmission electron microscopy image of the Pt-impregnated membrane via $H_2$-reduction and the number of counted particles with size distribution over a 10 μm membrane cross sectional area are shown.

Figure 3:
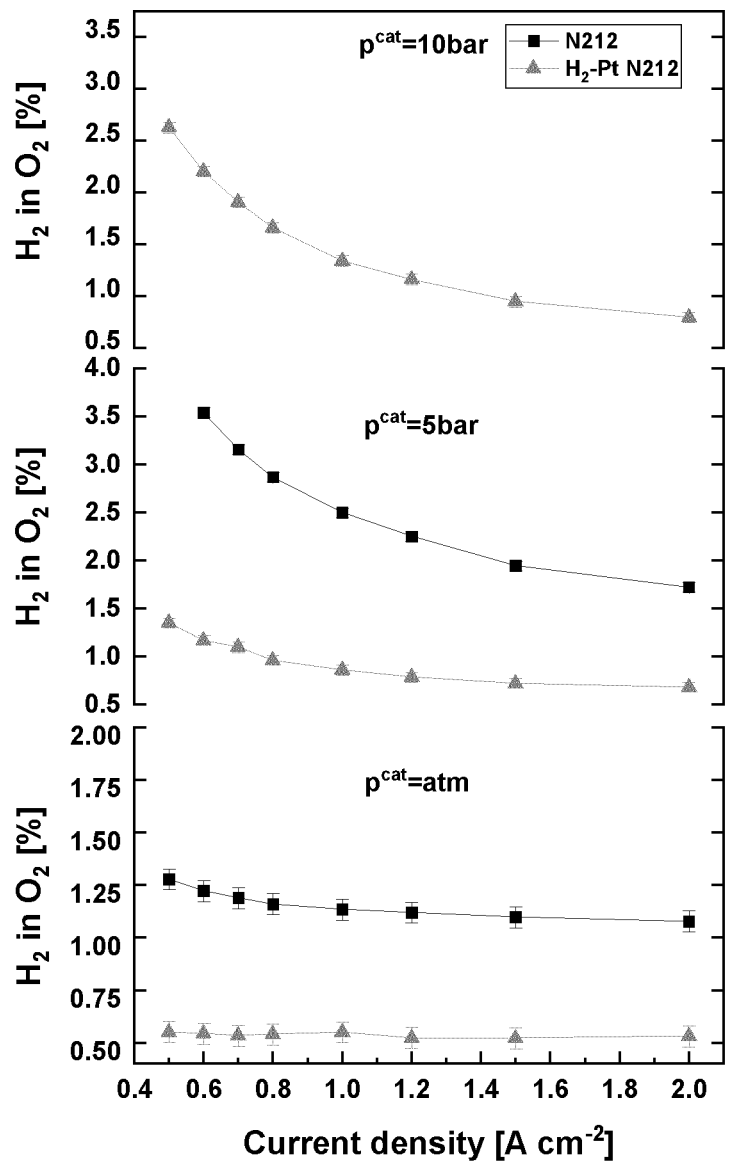
FIG. 3 the hydrogen content in oxygen in the anode compartment of a PEWE cell using a H2-Pt N212 and a pristine membrane (N212) at different current densities.

FIG. 3 shows the hydrogen content in oxygen in the anode compartment of a PEWE cell using a $H_2$-Pt N212 and a pristine membrane (N212) at different current densities. In detail, the content of hydrogen in oxygen at ambient cathodic pressure, 5 bar, 10 bar, and ambient anodic pressures respectively, and 60° C. for pristine N212 (black), and Pt doped N212 obtained by reduction with hydrogen ($H_2$-Pt N212, light grey). The data shows a decreasing hydrogen fraction with increasing current density as the rate of the oxygen evolution reaction is increasing. Pressure increase on the cathode side leads to a higher hydrogen permeation rate and increases the fraction of hydrogen in oxygen. In comparison to pristine N212, the hydrogen content was significantly reduced for the $H_2$-Pt N212 membranes over the whole current density range at all cathode pressures.

Figure 4:
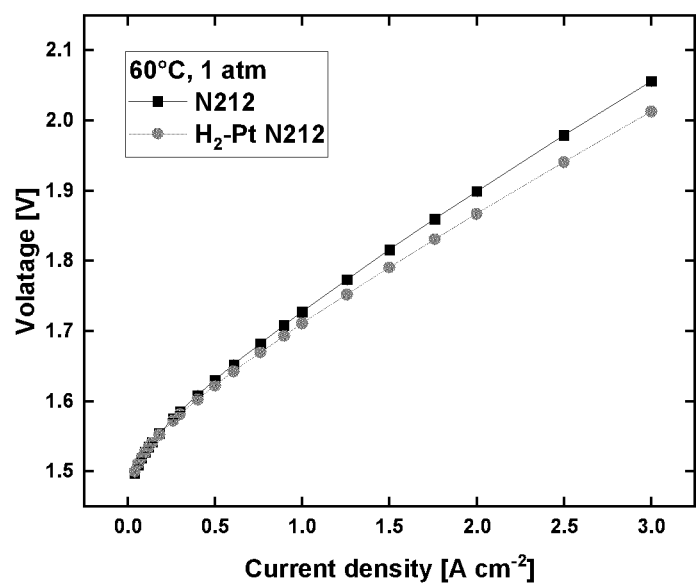
FIG. 4 polarization curves for PEWE cells using N212 (black), and $H_2$-Pt N212 (light grey), respectively, at 60° C. and ambient pressure.
Figure 5:
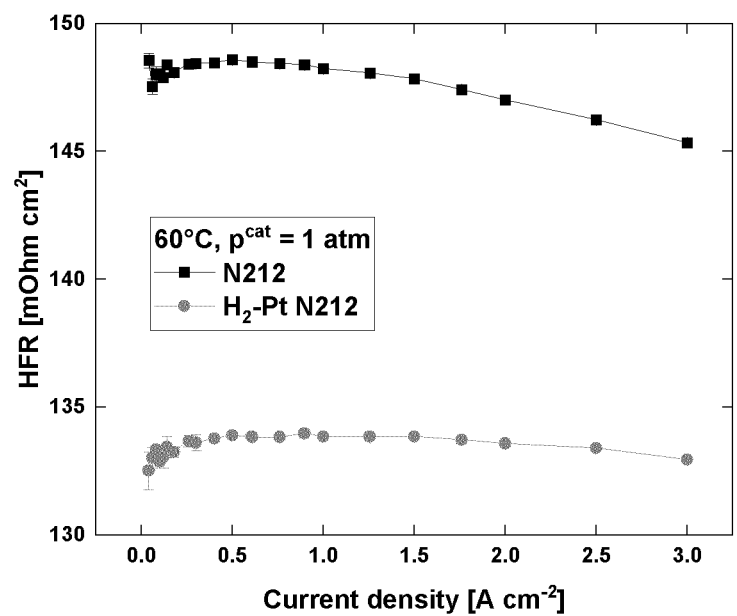
FIG. 5 HFR for PEWE cells using N212 (black), and $H_2$-Pt N212 (light grey), respectively, at 60° C. and ambient pressure.

In FIG. 4, PEWE polarization curves are shown at ambient temperature and at 60° C. The $H_2$-Pt N212 cell shows slightly better performance with increasing current density and the high frequency resistance (HFR) as shown in FIG. 5 differs on average by a value of 14 mΩcm$^2$. This could be due to variations in clamping pressure during cell assembly. Furthermore, recombination of hydrogen and oxygen to water on the platinum particles in the membrane could cause a conductivity increase of the membrane.

Platinum-Ion Doping of the Membranes

The membranes (A=100 cm$^2$, Nafion N212, DuPont) were immersed in a 1 M NaCl solution for 2 h at 60° C. After rinsing with DI water, the membranes were transferred into a 50 mL sealable cylinder containing 1 mM (NH3)4PtCl2 for Pt-doping and were maintained therein for 24 h at 80° C.

Platinum-Ion Reduction in Membranes

The Pt-doped membranes were assembled into a PEWE cell with a gas diffusion layer (GDL) on each side. Liquid water was circulated in one compartment to humidify the membrane and a hydrogen pressure of 5 bar was applied to the other compartment. The part of the membrane which was exposed to the hydrogen had an area of $A_{red}$=66.2 cm$^2$.

Alternatively to the examples disclosed above with platinum, palladium or silver can be used as well.

Figure 6:
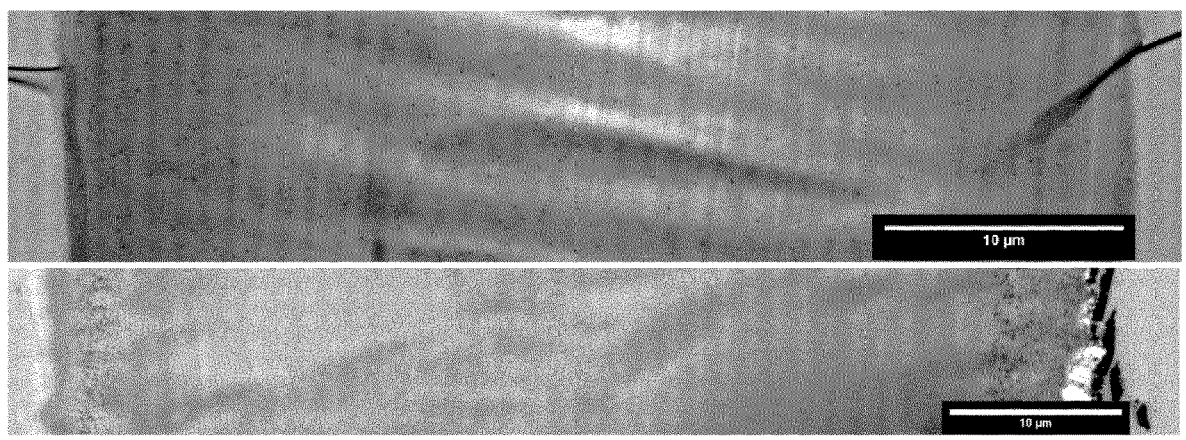
FIG. 6 TEM image of proton exchange membrane wherein the ionic platinum content has been reduced with hydrogen (top) and according to the prior art with hydrazine (bottom).

FIG. 6 shows TEM images of the distribution of platinum across the thickness of a ion exchange membrane. As discussed already above, the method according to Bessarov using hydrazine as reducing agent leads to the formation of a very inhomogeneous distribution of Pt recombination catalyst (black dots in the TEM images) across the thickness of the proton exchange membrane (see FIG. 6 bottom). Platinum particles accumulate disadvantageously rather close to the surface of the ion exchange membrane than homogeneously distributed across the thickness of the ion exchange membrane.

Different from that, FIG. 6, top, shows the result after the reduction of the ionic form of the metallic catalyst by the use of hydrogen ($H_2$) according to the present invention. The metallic Pt particles are homogeneously distributed across the thickness of the ion exchange membrane. Therefore, the solution according to the present invention provides a way to achieve thin ion exchange membranes with high crossover suppression, without a negative impact on the cell performance and a reduction in-situ on the flight by the homogenous distribution.

The invention claimed is:

1. A method of preparing an ionomer of an ion exchange membrane with a recombination catalyst to prevent gas crossover of species to anodic and cathodic cell compartments of an electrochemical cell, the method comprising the steps of:
   a) providing the ionomer of the ion exchange membrane as a proton or an anion exchange polymer;
   b) selecting the recombination catalyst from the precious metals group;
   c) providing the recombination catalyst selected in step b) in an ionic form in a liquid metal salt solution;
   d) immersing the ion exchange membrane into the liquid metal salt solution to thereby exchange at least a part of the ion exchange sites with the ionic form of the recombination catalyst;
   e) assembling the immersed ion exchange membrane in the electrochemical cell; and
   f) subsequently at least partially reducing the ionic form of the recombination catalyst into a metallic form by providing hydrogen gas at an elevated pressure on one side of the ion exchange membrane and forcing the hydrogen to permeate from the one side through the ionomer of the ion exchange membrane inside the electrochemical cell.

2. The method according to claim 1, which comprises forming the ion exchange membrane to prevent a gas crossover of hydrogen and/or oxygen.

3. The method according to claim 1, which comprises distributing the ionic form of the recombination catalyst homogenously over an entire cross section of the ionomer of the ion exchange membrane.

4. The method according to claim 1, wherein the electrochemical cell is a polymer electrolyte water electrolyzer.

5. The method according to claim 1, which comprises providing the ionic form of the recombination catalyst in a cationic form.

6. The method according to claim 1, wherein step b) comprises selecting platinum as the recombination catalyst.

7. The method according to claim 1, which comprises providing the ionic form of the recombination catalyst in an anionic form.

* * * * *